US008974615B2

(12) United States Patent
Dods

(10) Patent No.: US 8,974,615 B2
(45) Date of Patent: Mar. 10, 2015

(54) LABEL DISPENSING SYSTEMS AND METHODS

(75) Inventor: Steven M. Dods, St. Charles, MO (US)

(73) Assignee: Illinois Tool Works Inc., Glenview, IL (US)

( * ) Notice: Subject to any disclaimer, the term of this patent is extended or adjusted under 35 U.S.C. 154(b) by 387 days.

(21) Appl. No.: 13/529,135

(22) Filed: Jun. 21, 2012

(65) Prior Publication Data

US 2013/0340918 A1 Dec. 26, 2013

(51) Int. Cl.

*B32B 37/00* (2006.01)
*B65C 1/02* (2006.01)
*B65C 9/18* (2006.01)

(52) U.S. Cl.

CPC ............... *B65C 1/021* (2013.01); *B65C 9/1865* (2013.01)
USPC ........... 156/73.6; 156/358; 156/538; 156/556

(58) Field of Classification Search

USPC ................... 156/64, 73.6, 358, 538, 556, 580
See application file for complete search history.

(56) References Cited

U.S. PATENT DOCUMENTS

| | | | | |
|---|---|---|---|---|
| 4,366,023 | A * | 12/1982 | Voltmer | 156/542 |
| 5,902,449 | A * | 5/1999 | Moore | 156/541 |
| 5,938,890 | A * | 8/1999 | Schlinkmann et al. | 156/541 |
| 8,460,499 | B2 * | 6/2013 | Stenner et al. | 156/235 |

* cited by examiner

*Primary Examiner* — James Sells

(74) *Attorney, Agent, or Firm* — The Small Patent Law Group LLC; Christopher R. Carroll

(57) ABSTRACT

A label dispensing system includes a feed assembly, a separation assembly, an application assembly, and a control assembly. The feed assembly provides a label initially attached to a substrate. The separation assembly is located in a downstream location relative to the feed assembly, and includes an angled surface over which the substrate passes configured to at least partially separate the label from the substrate. The application assembly is articulable between a plurality of positions, including a first position at which the application assembly engages the label after the label is at least partially separated from the substrate and a second position at which the label is affixed to a target. The control assembly causes vibration of at least a portion of the application assembly proximate to the first position proximate to a time when the application assembly contacts the label.

13 Claims, 5 Drawing Sheets

LABEL DISPENSING SYSTEMS AND METHODS

BACKGROUND

The subject matter described herein generally relates to systems and methods for dispensing labels.

BRIEF SUMMARY

One or more embodiments described herein provide for a system (and method for providing the same) that provides for improved label dispensing. For example, the system may vibrate an actuator assembly proximate to a time when a label is first brought into contact with the actuator assembly.

BRIEF DESCRIPTION OF THE DRAWINGS

The present inventive subject matter will be better understood from reading the following description of non-limiting embodiments, with reference to the attached drawings, wherein below.

DETAILED DESCRIPTION

In accordance with one or more embodiments described herein, a label dispensing system and method for dispensing labels are disclosed. For example, in embodiments, a label dispensing system includes a feed assembly, a separation assembly, an application assembly, and a control assembly. The feed assembly provides a label initially attached to a substrate. The feed assembly may include, for example, a feed reel from which a film or tape of substrate to which labels are removably attached may be paid out. The feed assembly may also include guides positioned and configured to define a path for the substrate to follow as it travels toward a separation assembly. The separation assembly is located in a downstream location relative to the feed assembly, and includes an angled surface over which the substrate passes. The angled surface is configured to at least partially separate the label from the substrate. For example, as the substrate is bent over the angled surface, the label continues advancing in a feed direction toward an application assembly while the substrate is drawn toward a take-up reel. The application assembly is articulable between a plurality of positions, including a first position at which the application assembly engages the label after the label is at least partially separated from the substrate, and a second position at which the label is affixed to a target. The control assembly causes vibration of at least a portion of the application assembly proximate to the first position proximate to a time when the application assembly contacts the label.

Embodiments provide a vibrating application assembly for improved label dispensing and improved label separation from a substrate. In embodiments, at least a portion of an application assembly is reciprocally oscillated proximate to a time when the application assembly engages a label. Embodiments provide a technical effect, for example, of improved separation of labels from substrates and/or improved position of labels for fixation to targets. Embodiments may also provide a technical effect, for example, of reducing the inconveniences and expense caused by improperly applied labels, missing labels, and label jams in dispensing machinery.

Figure 1:
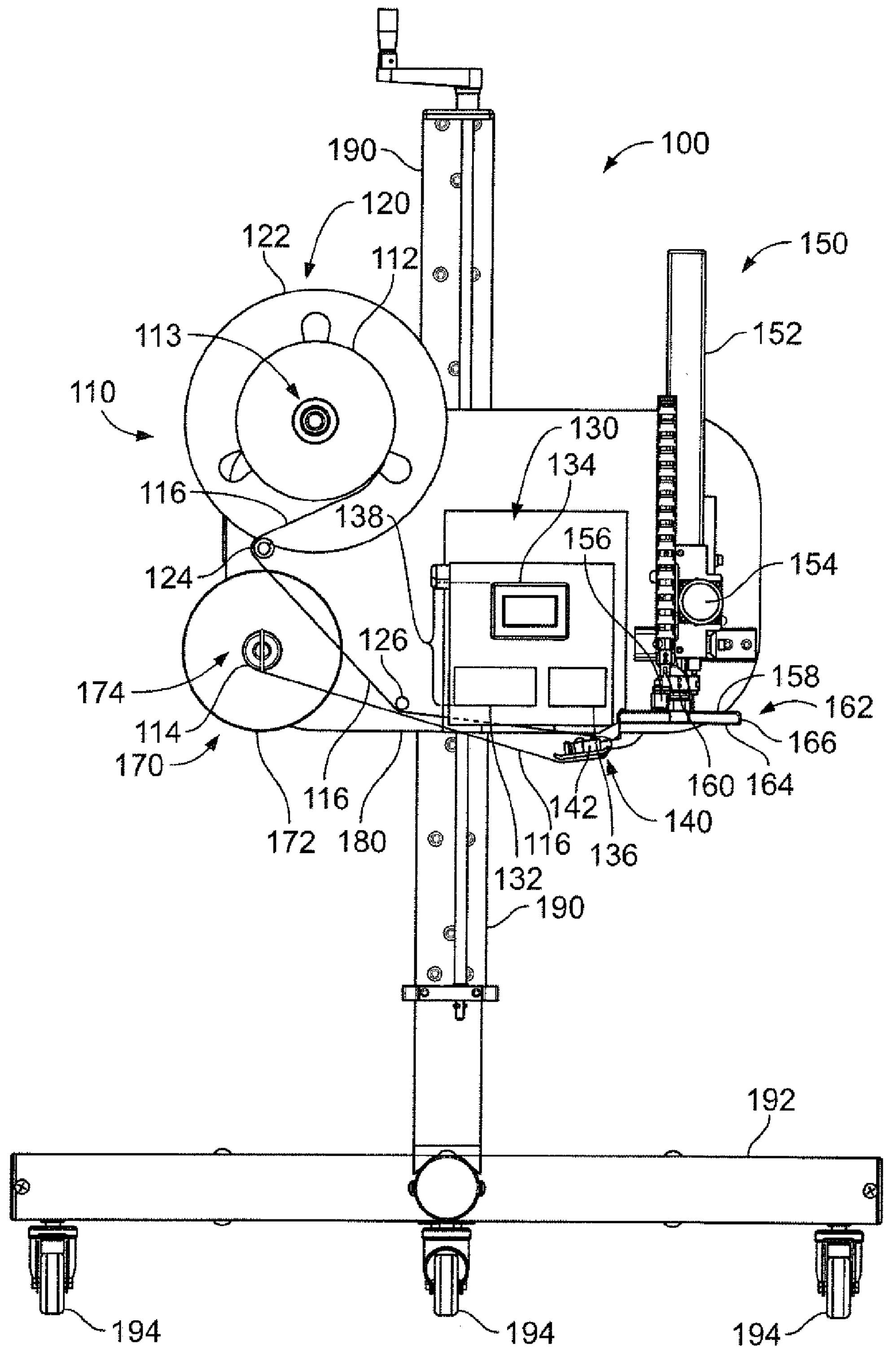
FIG. 1 is a schematic view of one embodiment of a label dispensing system.

FIG. 1 is a schematic view of one embodiment of a label dispensing system 100. The label dispensing system 100 includes a roll assembly 110, a feed assembly 120, a print control assembly 130, a separation assembly 140, an application assembly 150, a take-up assembly 170, a base 180, and a stand 190. The label dispensing system is configured to apply labels to targets, such as boxes, packages, containers, or other items. Generally speaking, labels removably mounted to a substrate are drawn, as part of the roll assembly, from the feed assembly 120, through the print control assembly 130, and past the separation assembly 140 where the labels are separated from the substrate. The separated labels are then affixed to a desired target by the application assembly 150, while the substrate is collected by the take-up assembly 170.

Figure 2:
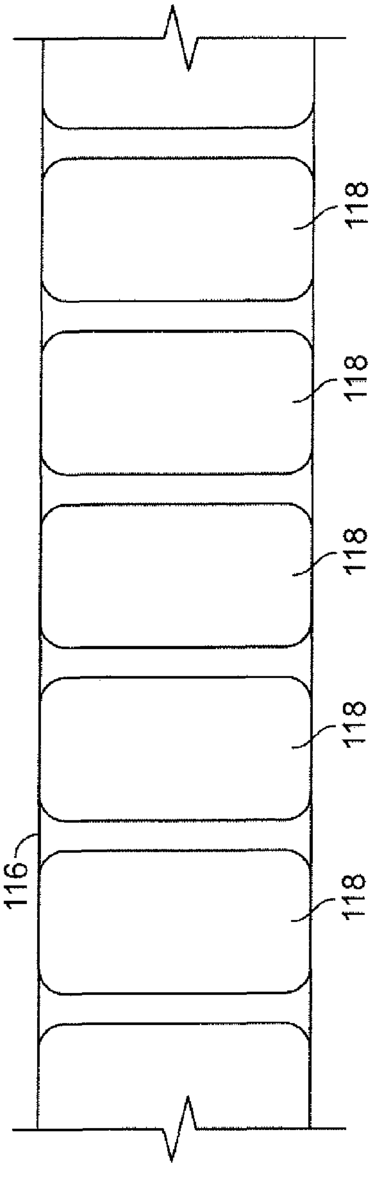
FIG. 2 is an overhead view of a portion of a label roll in accordance with an embodiment.

The roll assembly 110 includes a source roll 112. The source roll 112 includes a winding of a substrate 116 to which are removably mounted a plurality of labels 118. The substrate 116 is, for example, a continuous web, tape, or film that is drawn from the feed reel 122 to and around a take-up reel 172 of the take-up assembly 130. The substrate 116 is wound about an opening 113 that is sized to be accepted by the feed reel 122. FIG. 2 illustrates a top view of a length of the substrate 116. The labels 118 are intermittently spaced about the substrate 116. In the illustrated embodiment, the labels 118 are uniformly sized and spaced along the substrate 116. Also, in the illustrated embodiment, the labels are provided as blank when the substrate 116 with labels 118 attached is loaded onto the feed reel 122. In the illustrated embodiment, the labels 118 will be printed at a location interposed between the feed reel 122 and the target to which the labels 118 will be affixed. In other embodiments, the labels may be pre-printed before the substrate is formed into a roll or loaded on to a feed reel.

In the illustrated embodiment, the substrate 116 and labels 118 are shown in a simplified format for clarity of discussion of certain aspects of the presently disclosed inventive subject matter. In practice, the substrate 116 and labels 118 may be composed of multiple layers. For present purposes, two aspects that should be noted are the label adhesive and the release silicone agent used to facilitate the removal of the label for automated applications. The label adhesive is located generally on an underside (the side oriented toward the substrate) of the label, and the release silicone agent is located generally on an upper surface (the surface oriented toward the label) of the substrate. The label adhesive and release silicone agent are selected and configured so that the label adheres well to the desired end target, but the adhesive adheres less well to the substrate with release silicone agent so that the label may be removed from the substrate when the substrate is bent a given amount.

Returning to FIG. 1, as the substrate 116 is unwound from the feed reel 122 and drawn toward the take-up reel 172, the substrate 116 and labels 118 advance toward the separation assembly 140 where the labels 118 are removed from the substrate 116. Thus, as the substrate 116 is wound about the take-up reel 172 to form the take-up roll 114, the labels 118 are no longer present on the substrate 116. Thus, the source roll 112 includes the substrate 116 and labels 118, whereas the take-up roll 114 includes only the substrate 116 (provided that all labels 118 have been properly removed by the separation assembly).

The feed assembly 120 includes the feed reel 122, a first guide 124, and a second guide 126. The feed reel 122 accepts the source roll 112, and rotates as the source roll 112 is paid out toward the separation assembly 140. The first guide 124 and the second guide 126 are positioned to guide the substrate 116 (with the labels 118 still attached) toward the separation assembly 140. For example, in embodiments, the first guide 124 and the second guide 126 include wheels or rollers mounted on pins, bushings, and/or bearings that the substrate 116 passes over, changing directions as it passes by a given guide. In other embodiments, guides that do not include wheels or rollers may be employed. The position of the guides may be adjusted or controlled, for example, to help provide or maintain a desired tension in the substrate 116 as it is drawn through the system 100, as well as to direct the substrate 116 in a desired direction. Other arrangements, types, numbers, and/or positions of guides may be used in alternate embodiments.

The print control assembly 130 includes a control module 132, a user interface 134, a printing assembly 136, and a housing 138. In the illustrated embodiment, the housing 138 provides an area for mounting and securing the control module 132, user interface 134, and printing assembly 136. The housing 138 may also include a cover (not shown for clarity) to help protect, for example, the printing assembly 136 and/or other components from exposure. In alternate embodiments, separate housings may be provided for one or more components, or alternate mountings may be employed. In the illustrated embodiment, the labels 118 are printed by the printing assembly 136 as the substrate 116 with labels 118 attached passes by the housing 138 (the substrate 116 is oriented with the labels 118 facing the printing assembly 136, or upward in the sense of FIG. 1). In alternate embodiments, pre-printed labels (e.g. labels that have already been printed before the substrate 116 with labels 118 attached is loaded onto the feed reel 122) may be employed, in which case the printing assembly 136 may not be required, or may be by-passed or otherwise not utilized when pre-printed labels are dispensed.

The control module 132 is operably connected to other components of the system 100 and is configured to control the operation of the system 100. For example, the control module 132 may be used to control the speed at which the substrate 116 is advanced through the system 100 (for example, by controlling a rotational speed of one or more reels); the tension in the substrate 116 (for example, by controlling a torque associated with one or more reels and/or the rotational speeds of the reels and/or a position of guides); and/or the positioning and/or movement of the application assembly 150. In the illustrated embodiment, the control module 132 is mounted in the housing 138 of the system 100. In alternate embodiments, the control module may be partially or entirely integrated into a control module located remotely and/or associated with related equipment, such as a conveyor system for transporting items to be labeled. The control module 132 may also control the operation of related equipment, such as, for example, a conveyor belt that sequentially provides a plurality of target objects for receiving labels, or the control module 132 may be in communication and/or under control of a controller associated with such related equipment. Further, the control module 132 may be operably connected to one or more sensors that provide the control module 132 with information regarding the position of one or more targets to receive labels, and/or diagnostic information regarding the system 100, and/or information regarding operating parameters of the system 100, such as the position of various components of the system 100, for example the aim 152.

As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The user interface 134 is configured to provide information to an operator and/or receive input from an operator regarding, for example, the settings, status and/or operation of the system 100 and/or portions of the system 100. In some embodiments, the user interface 134 may include a single unit configured to provide information and receive input, such as a touchscreen. Additionally or alternatively, the user interface may include separate display and input screens. The user interface 134 may also include a keypad, mouse, or the like to facilitate operator input. Information provided by the user interface 134 may include, without limitation, information regarding the status of the system 100 and/or subsystems such as the printing assembly 136; counters for either or both of the printing assembly 136 (e.g. number of labels printed) or the application assembly 150 (e.g. number of labels applied); error monitors; detection of a broken substrate or liner; or information regarding the positioning of the application assembly. The user interface 134 may also provide information to an operator via a display portion, for example status information regarding operations, and/or diagnostic information regarding, for example, warnings, alerts, components requiring maintenance, performance measures, or the like.

In embodiments, the user interface 134 provides for a variety of different input methods. For example, in addition to the use of, for example, a touchscreen, or as another example, a keypad located proximate to the system 100, input may also be provided remotely from, for example, a wired Ethernet connection or, as another example, a wireless connection. Further, for example, formats for printing may also be provided and stored by, as one example, an internal card, or, as another example, a removable USB thumb drive.

The printing assembly 136 is configured to apply printed information to a label 118 before the label 118 is affixed to the target. The printing assembly 136 is interposed between the feed reel 122 and the separation assembly 140. In the illustrated embodiment, the printing assembly 136 is located within the housing 138 where it is protected from exposure and to help provide a controlled environment for printing. The housing 138 may include a removable cover that provides easy access to any modules or assemblies mounted therein. The system 100 may be configured to provide for a variety of interchangeable printing modules that may be removably mounted to the housing 138, allowing the use of a variety of printers or print engines, as well as allowing for quick replacement of a printing assembly requiring maintenance or repair. In some embodiments, pre-printed labels may be provided. In such embodiments, the printing assembly may not be required, or may be bypassed or otherwise not used when pre-printed labels are employed.

The separation assembly 140 is configured to facilitate the separation of the labels 118 from the substrate 116. In the illustrated embodiment, the separation assembly 140 includes a separation blade (or peel blade) 142 having an angle 144. The separation blade 142 is positioned downstream from the printing assembly 136, and is interposed between the second guide 126 and the take-up reel 172. As the substrate 116 is drawn to the take-up reel 172, the substrate 116 is bent or biased over the separation blade 142, facilitating the separation or peeling of the labels 118 from the substrate 116. A label, as it peels off of the substrate, thus continues to advance in generally the same direction as before the peeling, however at an angle that is proportional to the amount of adhesive bonding strength of the label in conjunction with the angle of the edge of the peel blade.

Figure 3:
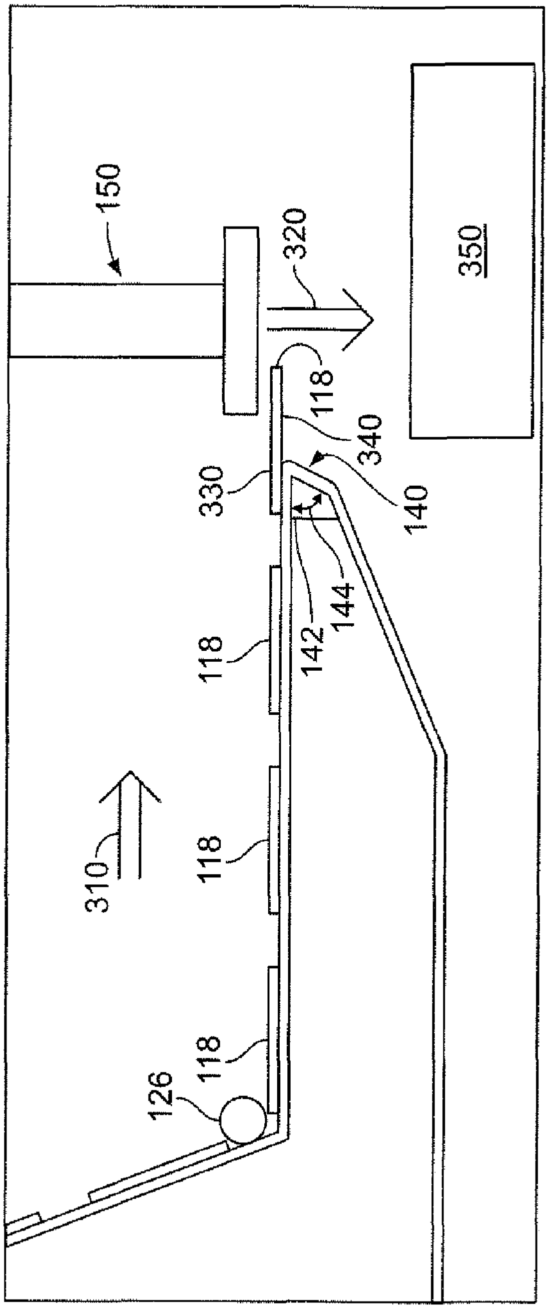
FIG. 3 is an enlarged view of a label being separated from a substrate in accordance with an embodiment.

FIG. 3 provides an enlarged view of an embodiment of a separation assembly 140 including a separation blade (or peel blade) 142. As indicated above, the separation blade 142 includes an angle 144. In the illustrated embodiment the angle 144 is an acute angle. The angle 144 is configured to facilitate the separation or peeling of labels off of a substrate as the substrate passes over and is bent or biased over the separation blade 142. In FIG. 3, the substrate and labels advance from the second guide 126 toward the application assembly 150 along a feed direction 310. The feed direction 310 in FIG. 3 is generally horizontal, but other feed directions may also be employed. At the separation blade 142, the labels 118 separate from the substrate and continue generally in the feed direction 310, while the substrate 116 is bent over the separation blade 142 and advances toward the take-up reel 172 (not shown in FIG. 3; see FIG. 1).

As a label 118 separates from the substrate 116, the label 118 is oriented with a printed side 330 oriented upward in the sense of FIG. 3 (with printing provided on the printed side 330, for example, by a printing assembly 136 as discussed above, or as another example, prior to loading on to the system 100 as pre-printed labels). Further the label 118 is oriented with an adhesive side 340 oriented toward a target 350 to which the label 118 is to be applied (downward in the sense of FIG. 3). As discussed more fully below, as the label 118 continues to advance, the application assembly 150 engages the label 118, and subsequently directs the label 118 along an application direction 320 toward the target 350. In FIG. 3, the application direction 320 is generally downward. In alternate embodiments, different application directions may be employed. Further, in the embodiment depicted in FIG. 3, the feed direction 310 and the application direction 320 are substantially perpendicular to each other. In alternate embodiments, other arrangements may be employed.

A number of variables may affect the peeling or separation efficiency of separating a label from the substrate. These include the amount of release agent, (for example silicone coating) applied to, for example, a paper portion of a substrate or liner; the aggressiveness of the adhesive being used for the label (with the adhesive being used usually determined by the need of a particular application); the angle of the peel blade; the tension developed on opposing sides of the peel blade; the addition of an air knife or pressurized flow of air directed to force a separation between the label and the substrate at or near the point of peeling or separation; the depth of the diecut (the cutting process of forming the label within a continuous adhesive top sheet); and/or the age of the materials used and/or storage conditions.

Certain known label dispensing systems can experience a number of difficulties in dispensing labels when one or more of the above discussed or other factors are not within acceptable boundaries. For example, in an extreme case, the label may not separate from the substrate at all. As another example, the label may begin to peel, but the angle of separation changes, and the label does not feed out to a proper position for subsequent application. The angle of separation may change, for example, due to one or more of adhesive aggressiveness, insufficient tension, or lack of enough release agent. As another example, the label may peel and advance to or near the desired position for subsequent application, but the trailing edge of the label remains connected to the substrate. Upon attempted application, the label then hinges or rotates about the edge where the label remains joined to the substrate, and is not affixed to the target.

An air knife or air pressure may be employed to attempt to separate a label from a liner or substrate. However, such an air knife or air pressure may blow the label off the application assembly or result in misalignment of the label. For example, the air pressure may be substantially constant but the bond resistance may vary from label to label, resulting in too much pressure being used in connection with some labels (resulting, for example, in labels that are blown off or away from, for example, a tamp pad for applying labels) and/or not enough pressure being used in connection with other labels (resulting, for example, in labels that remain attached or hinged to the liner or substrate).

Similarly, a linkage or other articulating structure may be used to move an application assembly away from the separation or peel point once the label is engaged by the application assembly, for example, in a lateral direction. Such an approach, however, results in an undesirable amount of additional parts and potential points for failure. Further, such an approach may not adequately address, for example, issues relating to label face stocks with increased friction and drag resistance.

Embodiments of the present inventive subject matter provide a vibrating application assembly for improved label dispensing and improved label separation from a liner or substrate. In one or more embodiments, at least a portion of an application assembly is reciprocally oscillated proximate to a time when the application assembly engages a label. A vibrating mechanism can be integrally formed with a drive assembly for applying for a label. For example, an application assembly may include an arm with an application end for engaging a label. The arm may be operably connected with a drive mechanism that articulates the aim from a reception position (where the application end of the arm engages the label) to a label fixation position (where the label is applied to a target). Further, the arm may define a drive direction or drive path generally extending between the reception position and the label fixation position, and the arm may be oscillated between predetermined points a relatively short distance apart along the drive direction.

Further still, in one or more embodiments, at or near the reception position, the drive is controlled to move the arm back and forth generally along the drive direction or drive path, so that the same drive mechanism used to translate the arm between the reception and label fixation positions may also be used to vibrate or oscillate the arm at or near the reception position. Additionally or alternatively, the arm or other portion of the application assembly may be vibrated or oscillated in one or more directions generally perpendicular or otherwise oblique to the drive direction. In other embodiments, the translation between the reception and label fixation positions may be actuated by a different drive assembly than a drive assembly actuating the vibration, and, in still other embodiments, the same drive assembly may be used but different linkages may be employed for the translation between the reception and fixation positions and the vibration. The vibration or oscillation is used to separate labels that would otherwise, for example, remain attached or hinge, cause label jams, and/or cause labels to avoid being applied with the adhesive side facing the product or otherwise improperly oriented.

Returning to FIG. 1, the application assembly 150 includes an arm 152, a drive assembly 154, a vacuum assembly 156, and a tamp pad 158. In the illustrated embodiment, the tamp pad 158 is mounted proximate to an application end 162 of the arm 152 by a pivot joint 160. In the illustrated embodiment, the drive assembly 154 includes a brushless direct current (DC) servo motor. In alternate embodiments, other devices may be employed in connection with the drive assembly.

The drive assembly 154 is configured to articulate the actuator, such as the arm 152. The arm 152 is articulated between positions to receive a label 118 and then to affix the label 118 to the target 350. For example, the arm may 152 may be positioned in a reception position with the tamp pad 158 proximate to a location where the label 118 is being separated from the substrate 116. Then, after the label 118 is engaged by the tamp pad 158, the arm 152 is articulated by the drive assembly 154 to move in the application direction 320 toward the target 350 (for example, downward in the sense of FIGS. 1 and 3). After the tamp pad 158 is brought into contact with the target 350 to affix the label 118 to the target 350, the arm 152 may be retracted along the application direction (for example, upward in the sense of FIGS. 1 and 3) to be brought into a reception position to engage the next label 118 for subsequent application.

In the depicted embodiment, the drive assembly 154 is a brushless DC servo motor. The brushless DC servo motor drives the arm or actuator, providing effective speed and accuracy for a variety of labeling applications. The DC motor, for example, may receive current from an associated rectifier that receives power from a standard alternating current (AC) outlet. The brushless DC servo motor can also provide reliable and dependable service in applications requiring maximum uptime and high repeatability. Use of an electrically powered drive assembly, for example, removes the need for use of compressed air associated with some other actuators, and can also increase the ease of portability for the system 100 by allowing, for example, use of energy available from commonly available electrical outlets. In embodiments, the drive assembly 154 and the arm 152 may be sized and configured to provide, for example, a maximum stroke length of about 10 inches, or as another example, a maximum stroke length of about 20 inches. The stroke range may be variable. The operation of the brushless DC servo motor may be controlled, for example, by the control module 132, and sensors may be used to detect the position of, for example, the tamp pad and/or the target. For example, sensors may provide information to the control module 132 or other controller when the tamp pad 158 is proximate to the peel or separation point, or as another example, when the tamp pad 158 is proximate to the target 350, or as one more example, when the target 350 is in a desired position for label fixation.

In the illustrated embodiment, the drive assembly 154 not only moves the arm 152 between the above described positions, but is also controlled to vibrate or oscillate the arm 152. In the illustrated embodiment the vibration is a fairly rapid, controlled, back and forth or reciprocal motion (generally up and down in the sense of FIGS. 1 and 3) over a substantially smaller range than the stroke used to move between positions. For example, the drive assembly 154 may define a minimum increment of actuation. As one example, for a DC brushless servo motor, the smallest increment of actuation corresponds to a movement between two adjacent or sequential positions of the motor. Thus, a DC motor may be toggled between adjacent or sequential positions to provide the vibration. The vibration thus may be accomplished by moving back and forth at a minimum increment of actuation. In other embodiments, other increments may be employed. For example, a brushless DC servo motor could be toggled between non-adjacent or non-sequential positions. Thus, in embodiments, the vibration occurs between two predetermined points that are a predetermined increment apart. The increment may be, for example, a minimum actuation increment or a multiple thereof. The increment, in embodiments, may correspond to an excitation of different poles corresponding to adjacent positions of a brushless DC motor, a step of a stepper motor, a revolution or a given number of revolutions of a shaft, gear, or pinion, or a distance corresponding to a movement between adjacent teeth or a given spacing of teeth associated with a rack or other gearing.

The tamp pad 158 is configured to engage the label 118 and direct the label 118 from the reception position to the fixation position. In the illustrated embodiment, the tamp pad 158 is joined to the arm 152 proximate to an application end 162 of the arm by a pivot 160. The pivot 160 is configured to help the tamp pad 158 conform to sloped or otherwise irregular target surfaces when the label 118 is being applied to the target 350. In embodiments, the tamp pad 158 is configured to securely engage the label to maintain the label in a desired position.

In the illustrated embodiment, a vacuum assembly 156 is associated with and operably connected to the tamp pad 158. The vacuum assembly 156 is configured to provide an air flow that results in at least a partial vacuum or a pressure differential used to attract, secure, and/or maintain a label 118 in a desired position against the tamp pad 158. For example, the vacuum assembly 156 may include a fan appropriately located and positioned so that it directs a flow of air proximate to a contact surface 164 of the tamp pad to draw a label 118 toward the contact surface 164. For example, the contact surface 164 and a side 166 of the tamp pad 158 may be provided with an array of holes or other openings in fluid communication with a chamber disposed within the tamp pad. Air may then be directed by a fan past the openings of the contact surface 164 and through the openings of the side 166, creating a pressure differential to draw a label 118 toward the contact surface 164. The fan and openings may be sized and configured to provide an appropriate pressure differential for a given label size or sizes (or label type or types). The tamp pad 158 is sized and configured to accommodate a variety of label sizes.

Figure 4A:
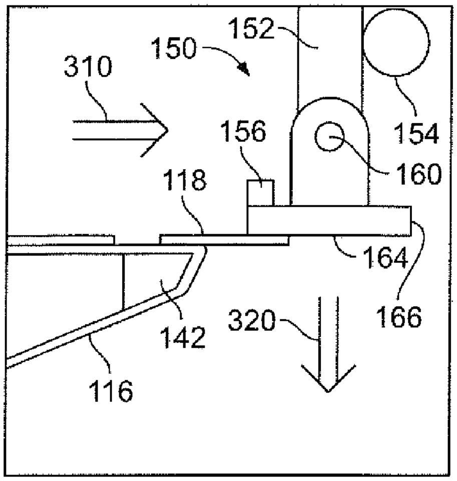
FIGS. 4*a*-4*c* depict various positions of an actuator assembly in accordance with an embodiment.
Figure 4B:
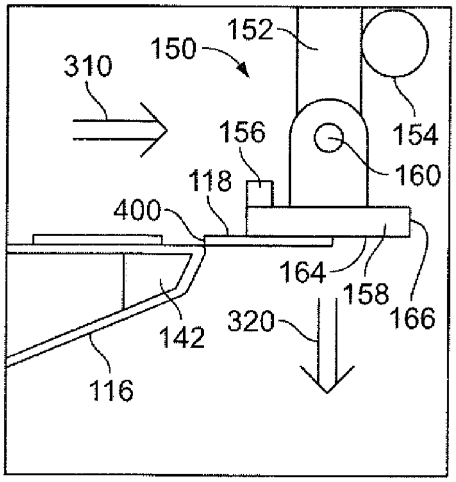
Figure 4C:
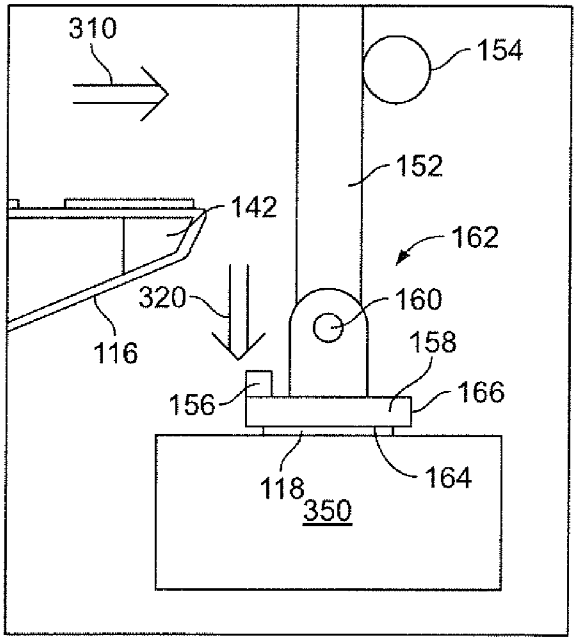

FIGS. 4*a*-4*c* depict an embodiment of the application assembly 150 at various positions and/or at various times during a label dispensing cycle. FIG. 4*a* illustrates the application assembly 150 at a reception position while the peeling or separating of the label has just begun. As seen in FIG. 4*a*, the label 118 has begun to separate from the substrate 116 as the substrate passes over the separation blade 142. In FIG. 4*a*, about one half of the label 118 has peeled off of the substrate 116, and about one half of the label 118 remains attached to the substrate 116.

As the label continues to be fed out in the feed direction 310 toward a desired position, the label 118 is engaged by the tamp pad 158. For example, the vacuum assembly may be turned on as the label 118 approaches a desired end position on the tamp pad 158 for label application to draw the label 118 toward the contact surface 164 of the tamp pad 158. In other embodiments the vacuum assembly 156 may be left in a generally continuous on position and provide a generally constant pressure differential, and the system components and operating parameters configured so that the pressure differential is sufficient enough to secure the label 118 in a desired position against the contact surface 164 of the tamp pad 158, while still being low enough that the separation and feeding process are sufficient to advance the label 118 in the feed direction 310 against the contact surface 164 while the vacuum or pressure differential is being applied. In still other embodiments, the vacuum assembly may be controlled to provide different pressure differentials at different times during label dispensing. For example, a lower pressure differential may be provided during feeding of a label, and a higher pressure differential provided during an application stroke. In some embodiments, the initial position of the tamp pad 58 will be at or near the level or position of the label 118 as the label 118 separate from the substrate 116. In other embodiments, there may be a gap between the contact surface 164 of the tamp pad 158 and the label 118 as the label 118 separates from the substrate 116.

FIG. 4*b* depicts the application assembly 150 in a vibrating position, with the tamp pad 158 located at or near the level or position where the label 118 peels or separates from the substrate 116, with the label 118 drawn against the contact surface 164 of the tamp pad 158. At this point, the trailing edge 400 of the label 118 may still be attached, by friction and/or adhesive forces, to the substrate 116. In the vibrating position, or oscillating position, the drive assembly 154 actuates the arm 152 (and the tamp pad 158 attached to the arm 152) in a back and forth manner generally along application direction 320. The distance covered during the vibration may be generally small. For example, as discussed above, the distance may correspond to a minimum actuation distance, such as the distance covered by the tamp pad 158 corresponding to the toggling of a servomotor between adjacent positions. The tamp pad 158 may be caused to vibrate back and forth either once before an application stroke (an application stroke being understood as a movement of the tamp pad 158 from at or near the reception position to the fixation position) is applied, or a desired plurality of times.

In embodiments a DC servomotor having four poles and six positions per pole is used to actuate the arm 152. Thus, the DC servomotor defines 24 available positions per revolution. For a given application, two appropriate positions are selected to be toggled between. The selection is based upon the beginning position of the tamp pad 158 (so that the tamp pad 158 is positioned as desired relative to the level or position at which the label 118 separates from the substrate 116), with the second motor position selected to achieve sufficient vibration to achieve the desired separation without losing position of the tamp pad 158 relative to the separation blade 142 or separation level or position. In the illustrated embodiment, the vibration is substantially along the application direction 320. In some embodiments, the second motor position corresponds to a location of the tamp pad farther from the target than the beginning position, while in other embodiments the second motor position corresponds to a location of the tamp pad closer to the target than the beginning position. In other embodiments, other types of vibration (e.g. in additional or alternate directions; achieved by different drive mechanisms; oscillations involving three or more positions; vibrations of variable length, timing, or frequency) may be employed.

Figures 6A, 6B, 6C:
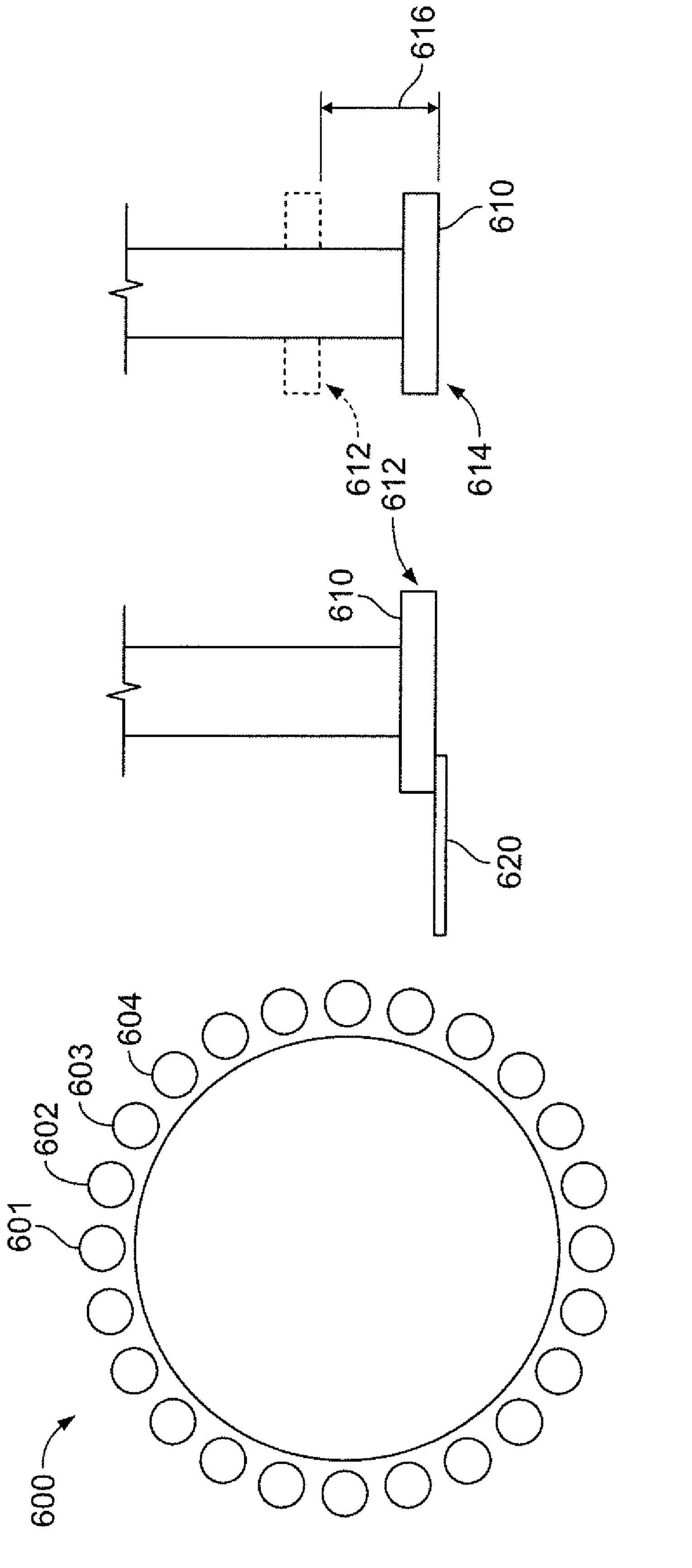
FIGS. 6*a*-6*c* depict various positions of an actuator in accordance with an embodiment.

FIGS. 6*a*-6*c* depict various positions of an actuator in accordance with an embodiment. The embodiment of FIGS. 6*a*-6*c* utilizes a brushless DC motor 600 to actuate a tamp pad 610. The brushless DC motor 600 is depicted schematically in FIG. 6*a*. The brushless DC motor 600 has four poles and six positions per pole, thereby defining 24 positions per revolution. Other arrangements may be used in alternate embodiments. For simplicity, in FIG. 6*a*, four of the twenty-four positions (a first motor position 601, a second motor position 602, a third motor position 603, and a fourth motor position 604) are identified. The discussion herein is limited to the motor positions 601, 602, 603, and 604, but could apply to other positions as well. The first motor position 601, second motor position 602, third motor position 603, and fourth motor position 604 are sequential, with each motor position adjacent to the preceding and following numerically identified motor positions. Each motor position 601, 602, 603, and 604 corresponds to a related position of the tamp pad 610, and the related positions of the tamp pad 610 may be toggled or oscillated between by toggling or oscillating the motor 600 between the various positions.

For example, in the illustrated embodiment, the first motor position 601 of the motor 600 corresponds to a reference position 612 of the tamp pad 610 (see FIG. 6*b*). In FIG. 6*b*, the reference position 612 is defined as the point at which the tamp pad 610 initially contacts a label 620 being advanced in a feed direction. For example, a sensor may provide a control module with a signal when the tamp pad 610 is in the reference position 612. In alternate embodiments, different reference positions may be used. By controlling the application of DC voltage to different poles of the motor 600, different positions may be moved between. For example, FIG. 6*c* depicts the tamp pad 610 in a second position 614. The second position 614 is located a distance 616 downward from the reference position 612. In alternate embodiments, for example, the second position 614 could be located upward from the reference position. To vibrate or oscillate the tamp pad 610 between the reference position 612 and the second position 614, the motor 600 is oscillated between motor position 601 (the position of the motor 600 when the tamp pad is at the reference position 612) and another motor position corresponding to the second position 614.

For example, to keep the distance 616 of vibration at or near a minimum controlled amount, the second position 614 may correspond to the second motor position 602 (the motor position adjacent to the first motor position 601), and the motor toggled between motor positions 601 and 602. If a slightly larger distance 616 of vibration is desired, the second position 614 may correspond to the third motor position 603 (a non-adjacent motor position to motor position 601). If a still larger distance 616 is desired, the motor 600 may be toggled between the first motor position 601 and the fourth motor position 604. For other reference points and/or other distances, different positions may be employed.

In embodiments, the vibratory movement may be upward from the reference position instead of downward. Further, in embodiments, a vibration or oscillation may involve movements between more than two positions. Additionally, in embodiments, the positions selected and resulting vibratory movement may be varied, for example, based on label type. For example, a first, shorter vibratory distance may be selected for a first type of label that is easier to separate from the substrate, and a second, longer vibratory distance may be selected for a first type of label that is more difficult to separate from the substrate. As one more example, the vibratory distance may be selected based on system diagnostics. For example, if it is detected that a first, shorter vibratory distance is not providing desired separation performance, the system may then switch to a second, longer vibratory distance.

In the illustrated embodiment, the vibration occurs during the feed of the label, with a slight delay to continue vibration for a relatively short time after the feed of the label. In the illustrated embodiment, the vibration has a frequency in the low Hertz range. In embodiments, the vibration is performed at a frequency substantially at or near a resonance frequency corresponding to a movement of the arm 152 and tamp pad 158 for efficient separation. The vibration may occur for a predetermined number of cycles, for a predetermined length of time, or for a variable length of time or number of cycles based on operating conditions and/or label and/or substrate properties. For example, for labels that may be more difficult to separate based on storage time or conditions, a longer vibration period and/or longer vibration travel may be selected, for example by operator input, or as another example, as determined by a controller based on information input by an operator.

The vibration is sized and configured to automatically separate the label adhesive fiber bonds and/or overcome any frictional forces acting counter to separation from the liner or substrate without noticeably increasing the process time. Thus, embodiments provide for improved separation of labels from substrates and improved position of labels for fixation to targets. Embodiments reduce the inconveniences and expense caused by improperly applied labels, missing labels, and label jams in dispensing machinery.

After the vibration is complete, and with the label 118 properly positioned on the tamp pad 158, with the adhesive side 340 oriented toward the target 350, the control module 132 may provide a command or commands resulting in the servomotor completing the application stroke, and advancing the tamp pad 158 to the target 350. FIG. 4*c* illustrates the application assembly 150 in the fixation or application position, with the label 118 being applied to the target 350. The length of the stroke may be determined by a predetermined length, a signal from a sensor indicating when the tamp pad 158 is proximate to the target 350, or a combination thereof. The adhesive side 340 of the label 118 is thus brought into contact with the target 350, with the tamp pad 158 supporting the label 118 against the target 350 and pivoting as required if the target 350 provides a sloped, tilted, or otherwise irregular surface. The adhesive of the label 118 then secures the label 118 to the target.

After the label 118 is applied to the target 350, the arm 152 and tamp pad 158 are retracted by the drive assembly 154 back to the reception position. In some embodiments, the vacuum assembly 156 provides a generally constant pressure differential, and the adhesive is strong enough, once attached to the target 350, to overcome the force provided by the pressure differential, so that the label 118 remains affixed to the target 350 after the arm 152 is retracted away from the target 350. In some embodiments, the vacuum or pressure differential is turned off after the label 118 contacts the target 350. In other embodiments, the vacuum or pressure differential may be reduced to an intermediate level to facilitate separation of the label 118 from the tamp pad 158 after the label 118 has been affixed to the target 350.

Returning to FIG. 1, the take-up assembly 170 includes a take-up reel 172 including a loading feature 174. The take-up reel 172 has a motor (not shown) associated therewith to rotate the take-up reel to draw the substrate 116 from the feed reel 122 through the various portions of the system 100. As the substrate 116 (with labels 118 removed) accumulates on the take-up reel 172, a take-up roll 114 is formed. The take-up reel 172 draws the substrate 116 under tension through the system 100. The feed reel 122 may also have a motor or other device associated therewith to help generate or maintain tension in the substrate 116 as the substrate 116 is drawn toward and onto the take-up reel 172. Once a complete source roll 112 has been used, the take-up roll 114 formed by the substrate 116 is removed, and a new source roll added to the feed reel 122. The loading feature 174 is configured to accept a leading edge of the substrate of the new source roll. For example, the loading feature 174 may include a slot and/or a gripper sized and configured to accept and secure a leading edge of the substrate 116. With the leading edge secured in the loading feature 174, the take-up reel 172 may be actuated to draw the substrate of the new source roll through the system 100.

The base 180 is sized and configured to provide a mounting and/or housing for the various components of the system 100. The base 180 may also include one or more removable or pivotable covers for protecting components from exposure to an industrial environment. The base 180 is operably connected to the stand 190. In embodiments the base 180 is adjustable with respect to the stand. For example, the base 180 may be rotatably and/or slidably connected to the stand 190 to provide versatility and a variety of possible heights, positions, or orientations of the system 100. For example, in the illustrated embodiment, the system 100 is oriented so that the application direction 320 is generally downward. The base 180 may be adjusted to provide, for example, for sideways or, as another example, upward application of labels.

The stand 190 is configured to provide support for the various components of the system 100. As discussed above, the base 180 is adjustable for various positions and orientations with respect to the stand 190 in the illustrated embodiment. The stand 190, for example, may include a platform 192 with heavy duty casters 194 attached thereto to improve portability of the system 100. As discussed above, in embodiments utilizing electric drive assemblies, portability is further enhanced by not requiring a connection point to a compressed air system.

Certain embodiments discussed above have been depicted as a generally complete group of components including components spanning from the feed reel to the take-up reel. In other embodiments, sub-systems or components are provided for retro-fitting existing label dispensing systems. For example, in certain embodiments, a control module, servomotor and arm assembly are provided for use with existing reels and/or printing assemblies. In other embodiments, a control module is provided for use with an existing labeling system. The above are meant by way of example only, and are not meant to be exhaustive of the configurations provided, for example, for retro-fitting.

Figure 5:
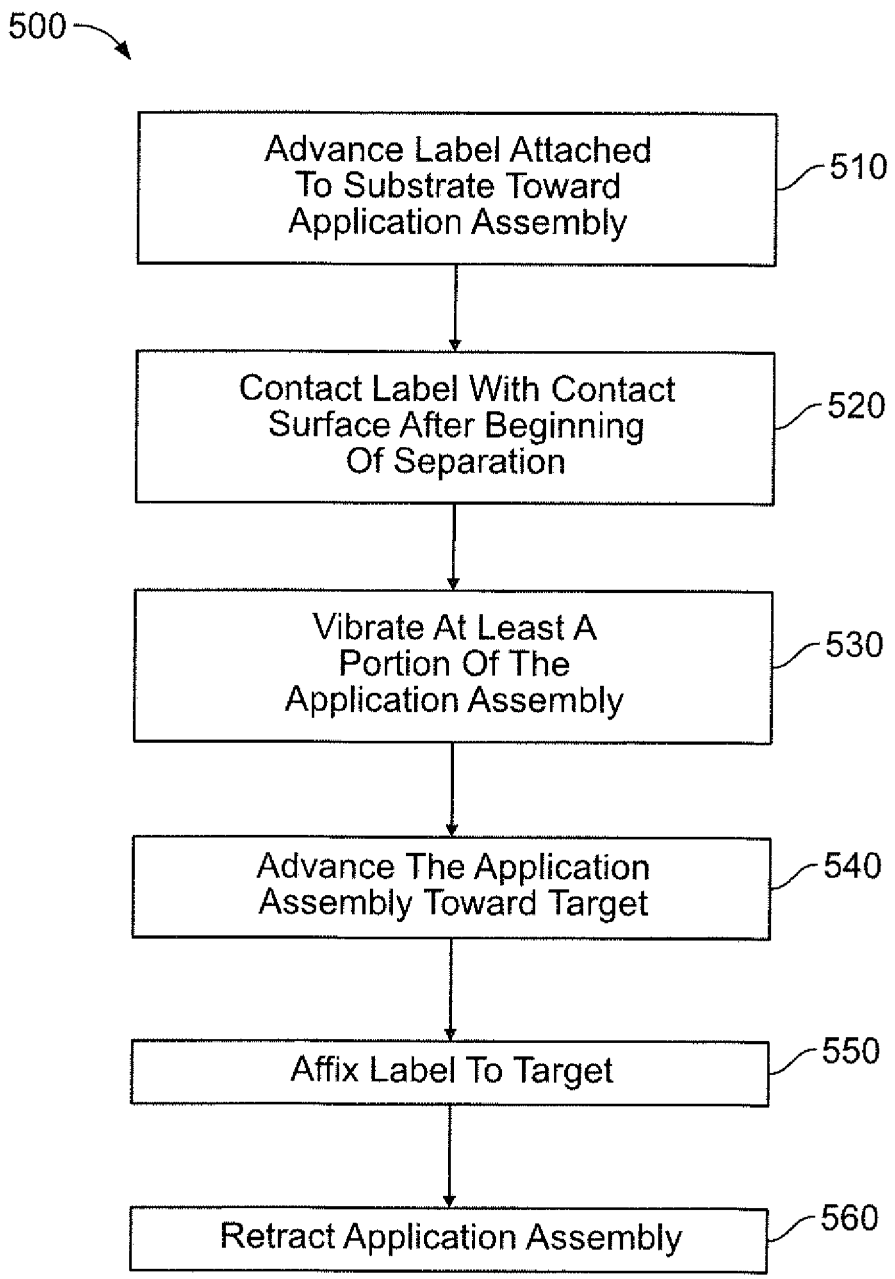
FIG. 5 is a flowchart of one embodiment of a method for dispensing labels.

FIG. 5 is a flowchart of one embodiment of a method 500 for dispensing labels and affixing labels to a target. The method 500 may be used in conjunction, for example, with one or more embodiments of the system 100 shown in FIGS. 1 through 4 and described herein.

At 510, a label is advanced toward an application assembly. The label is attached to a substrate at 510, and is advanced in a feed direction toward the application assembly. The application assembly is configured to receive the label and affix the label to a target. In some embodiments, the label may be pre-printed before being advanced toward the application assembly in the feed direction. In other embodiments, the label may be blank when initially advanced in the feed direction, and be printed during the label's route to the application assembly.

At 520, the label is contacted with a contact surface of the application assembly after at least a portion of the label has been separated from the substrate. For example, the label may pass over an acute angle of a separation blade of a separation assembly. As the substrate is bent back, the label continues in the feed direction, at least partially separating from the substrate. For example, the substrate may include a layer of silicone release agent interposed between an adhesive surface of the label and a paper or liner of the substrate, facilitating the separation of the label from the substrate. The application assembly, for example, may include a tamp pad having a contact surface configured to engage a label. The tamp pad may have a vacuum assembly associated therewith configured to provide a pressure differential that draws the label toward the contact surface and securably engages the label, so that the label may be secured in a desired position for affixing to the target.

At 530, at least a portion of the application assembly is vibrated at or near the time of contacting the label. For example, a drive assembly configured to move the application assembly from a reception position to a fixation position may be toggled reciprocally over a relatively short distance. The vibration in embodiment occurs substantially along or aligned with an application direction defined by a direction traveled by the application assembly during the affixing of a label. Alternatively or additionally, the vibration may occur in one or more additional directions.

At 540, the application assembly is advanced in the application direction toward the target. The label is engaged by at least a portion, for example a tamp pad, of the application assembly during the advancing. At 550, the label is brought into contact with and affixed to the target. After the label is secured to the target, the application assembly is retracted from the fixation position to the retraction position at 560. A next label may then be brought into contact with the application assembly and the steps repeated to affix the next label to a desired target.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While relative dimensions described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

What is claimed is:

1. A label dispensing system comprising:

a feed assembly configured to provide a label initially attached to a substrate;

a separation assembly located in a downstream location relative to the feed assembly, the separation assembly having an angled surface over which the substrate passes configured to at least partially separate the label from the substrate;

an application assembly articulable between a plurality of positions, the application assembly having a first position at which the application assembly engages the label after the label is at least partially separated from the substrate and a second position at which the label is affixed to a target; and a control assembly configured to vibrate at least a portion of the application assembly proximate to the first position proximate to a time when the application assembly contacts the label.

2. The system of claim 1, wherein the application assembly defines an application direction in which the label is moved toward the target, and the feed assembly defines a feed direction in which the label is moved toward the separation assembly, and wherein the feed direction and the application direction are substantially perpendicular.

3. The system of claim 1, wherein the application assembly includes an arm and a direct current (DC) motor, wherein the DC motor is operably connected to the arm and actuates the arm.

4. The system of claim 1, wherein the application assembly defines an application direction in which the label is moved toward the target, and wherein the application assembly includes a tamp pad that is vibrated substantially along the application direction.

5. The system of claim 4, wherein the application assembly includes an arm and a direct current (DC) motor, wherein the DC motor is operably connected to the arm and articulates the arm, wherein the tamp pad is connected to the arm positioned proximate to an end of the arm, and wherein the control assembly toggles the DC motor between positions of the DC motor, wherein the tamp pad is vibrated.

6. The system of claim 5, wherein the DC motor is toggled between adjacent positions.

7. The system of claim 1, wherein the application assembly comprises a tamp pad connected to the arm and located proximate to an end of the arm and a vacuum assembly that creates a pressure differential configured to urge the label against the tamp pad.

8. A method for dispensing a label, the method comprising:

advancing a label affixed to a substrate in a feed direction toward an application assembly;

contacting the label with a contact surface of the application assembly after at least a portion of the label has been separated from the substrate;

vibrating at least a portion of the application assembly temporally proximate to the contacting the label;

advancing the application assembly in an application direction, with the label engaged by at least a portion of the application assembly, toward a target to receive the label; and affixing the label to the target.

9. The method of claim 8 wherein the application direction and the feed direction are substantially perpendicular to each other.

10. The method of claim 8 wherein the vibrating is performed in a back and forth manner substantially aligned with the application direction.

11. The method of claim 8 wherein vibrating the application assembly includes toggling a direct current (DC) motor between positions of the DC motor.

12. The method of claim 11, wherein the toggling includes toggling between adjacent positions of the DC motor.

13. The method of claim 8, further comprising providing a pressure differential to engage the label to the contact surface.

* * * * *